United States Patent
Hayashida et al.

(10) Patent No.: US 6,490,758 B1
(45) Date of Patent: Dec. 10, 2002

(54) FRICTIONAL HINGE DEVICE

(75) Inventors: Takaaki Hayashida, Nagoya (JP); Masato Uneme, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/457,588

(22) Filed: Dec. 9, 1999

(30) Foreign Application Priority Data

Apr. 22, 1999 (JP) .......................................... 11-114322

(51) Int. Cl.⁷ .............................................. E05D 11/08
(52) U.S. Cl. ...................................................... 16/342
(58) Field of Search ........................................... 16/342

(56) References Cited

U.S. PATENT DOCUMENTS

| | | | | |
|---|---|---|---|---|
| 4,521,046 A | * | 6/1985 | Foggini ..................... 296/97 K |
| 4,758,855 A | * | 7/1988 | Tamamura et al. .......... 354/288 |
| 4,999,879 A | * | 3/1991 | Baer ............................ 16/354 |
| 5,052,078 A | * | 10/1991 | Hosoi ........................... 16/297 |
| 5,237,488 A | * | 8/1993 | Moser et al. ................ 361/729 |
| 5,542,505 A | * | 8/1996 | Kempf ..................... 188/77 W |
| 5,715,575 A | * | 2/1998 | Kubota ......................... 16/342 |
| 5,771,540 A | * | 6/1998 | Carpenter et al. ............ 16/308 |
| 5,832,566 A | * | 11/1998 | Quek et al. ................... 16/342 |
| 5,860,902 A | * | 1/1999 | Jang et al. .................... 492/13 |
| 6,000,796 A | * | 12/1999 | Claude et al. .............. 351/153 |
| 6,007,592 A | * | 12/1999 | Kasai et al. .................. 51/309 |
| 6,090,223 A | * | 7/2000 | Kiuchi et al. ................ 148/220 |
| 6,163,928 A | * | 12/2000 | Chung .......................... 16/342 |
| 6,163,929 A | * | 12/2000 | Bradley ........................ 16/380 |
| 6,174,019 B1 | * | 1/2001 | Collet et al. .............. 296/67.11 |
| 6,341,407 B1 | * | 1/2002 | Hayashida et al. ........... 16/342 |
| 6,381,809 B2 | * | 5/2002 | Uneme et al. ................ 16/342 |
| 6,385,815 B1 | * | 5/2002 | Hayashida et al. ........... 16/342 |

FOREIGN PATENT DOCUMENTS

| | | | | |
|---|---|---|---|---|
| JP | 5-154864 | | 6/1993 | |
| JP | 6-193636 | * | 7/1994 | ................. 384/276 |
| JP | 9-146342 | * | 6/1997 | |
| JP | 9-171297 | * | 6/1997 | |
| JP | P2000-320543 A | * | 11/2000 | |

* cited by examiner

Primary Examiner—Anthony Knight
Assistant Examiner—John B. Walsh
(74) Attorney, Agent, or Firm—Morgan, Lewis & Bockius LLP

(57) ABSTRACT

In a frictional hinge device, a metallic shaft 10 has an axis as a rotational center. A support block 20 is molded in synthetic resin (PC, PAR, PPS or the like) around the metallic shaft 10 so that the support block 20 is relatively rotatable with respect to the metallic shaft 10. The support block 20 is held at any angular position by a surface friction resistance between the support block 20 and the metallic shaft 10. In addition, an outer surface of the metallic shaft 10 is processed with a surface treatment to attain a surface roughness (Ra) ranging from 0.15 to 0.35 m. This ensures a stable surface frictional resistance between the support block 20 and the metallic shaft 10 with minimum scratch and stickslip.

2 Claims, 14 Drawing Sheets

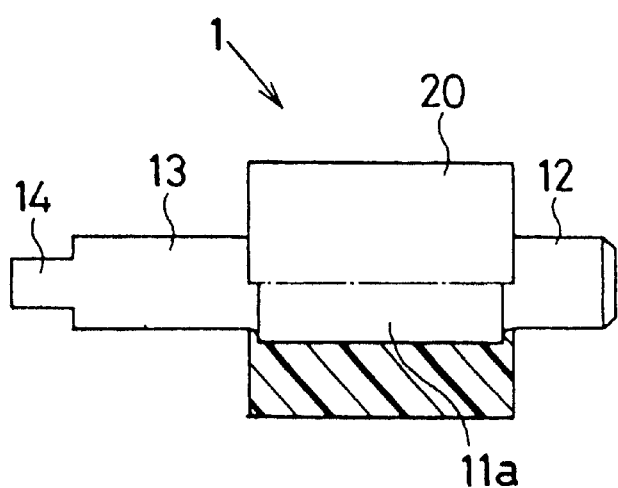
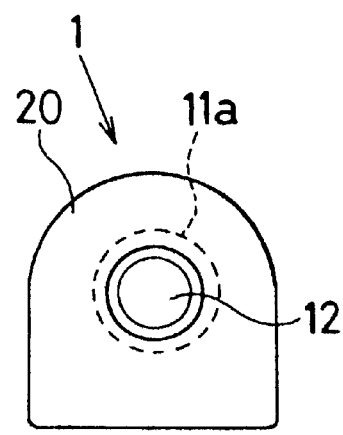

FRICTIONAL HINGE DEVICE

BACKGROUND OF THE INVENTION

1. Field of the Invention

The invention relates to a frictional hinge device which is used to pivotably support a lid and display of a portable business such as a laptop note type personal computer, and particularly concerns to a frictional hinge device used to frictionally hold the lid and display at desired pivotal angles.

2. Description of Prior Art

This type of the frictional hinge device is disclosed by Laid-open Japanese Patent Application No. 5-154864. This teaches that an outer shaft is made of a synthetic resin and integrally molded with an inner shaft. Due to a surface frictional resistance between the inner and outer shafts, it is possible to frictionally hold the inner shaft at the desired pivotal angle while permitting the inner shaft to rotate relative to the outer shaft against the force of the surface frictional resistance therebetween.

However, the disclosure remains silent about qualitative and quantitative analyses on the relationship between the inner and outer shafts. This causes no smaller variations on torque when the inner shaft pivotally moves. This also causes abnormal noise due to a stickslip phenomenon when pivotally moving the inner shaft while losing a good endurance with a torque reduced due to an unacceptable amount of wear between the inner and outer shafts.

Therefore, the present invention has been made with the above drawbacks in mind, it is a main object of the invention to provide a frictional hinge device which is capable of maintaining a stable frictional resistance between a shaft member and a support member for an extended period of time when frictionally holding the shaft member at desired pivotal angles based on the frictional surface resistance.

SUMMARY OF THE INVENTION

With a support member made of a resin molded to surround a shaft member, the support member tightly engages with the shaft member due to a residual stress established by a shrinkage allowance after molding the support member in integral with the shaft member. During the molding process, the synthetic resin is injected into a die mold in which the shaft member was beforehand placed.

When a surface frictional resistance appeared between the support member and the shaft member is smaller than an exterior torque to which the shaft member is subjected, the shaft member pivotally moves relative to the support member. When the surface frictional resistance exceeds the exterior torque, the shaft member is held at a desired pivotal angle due to the surface frictional resistance.

With the support member and the shaft member molded integrally, it is possible to manufacture them less costly while making it possible to readily determine the surface frictional resistance necessary to frictionally hold the shaft member at the desired pivotal position because the shaft member is provided with a surface roughness ranging 0.15 to 0.35 µm. This avoids an abnormal noise caused from the stickslip phenomenon, and exceedingly reduces the wear dust produced between the support member and the shaft member to maintain a stable surface frictional resistance therebetween for an extended period of time.

With the frictional hinge device used to pivotably move a display for a portable business device, it is possible to hold the display at desired angles to ensure a good position for visually recognizing what the display shows.

BRIEF DESCRIPTION OF THE DRAWINGS

A preferred form of the present invention is illustrated in the accompanying drawings in which:

FIG. 4 is a side elevational view of the frictional hinge device;

FIG. 5 is a plan view of the frictional hinge device;

DETAILED DESCRIPTION OF THE PREFERRED EMBODIMENTS

Figure 1:
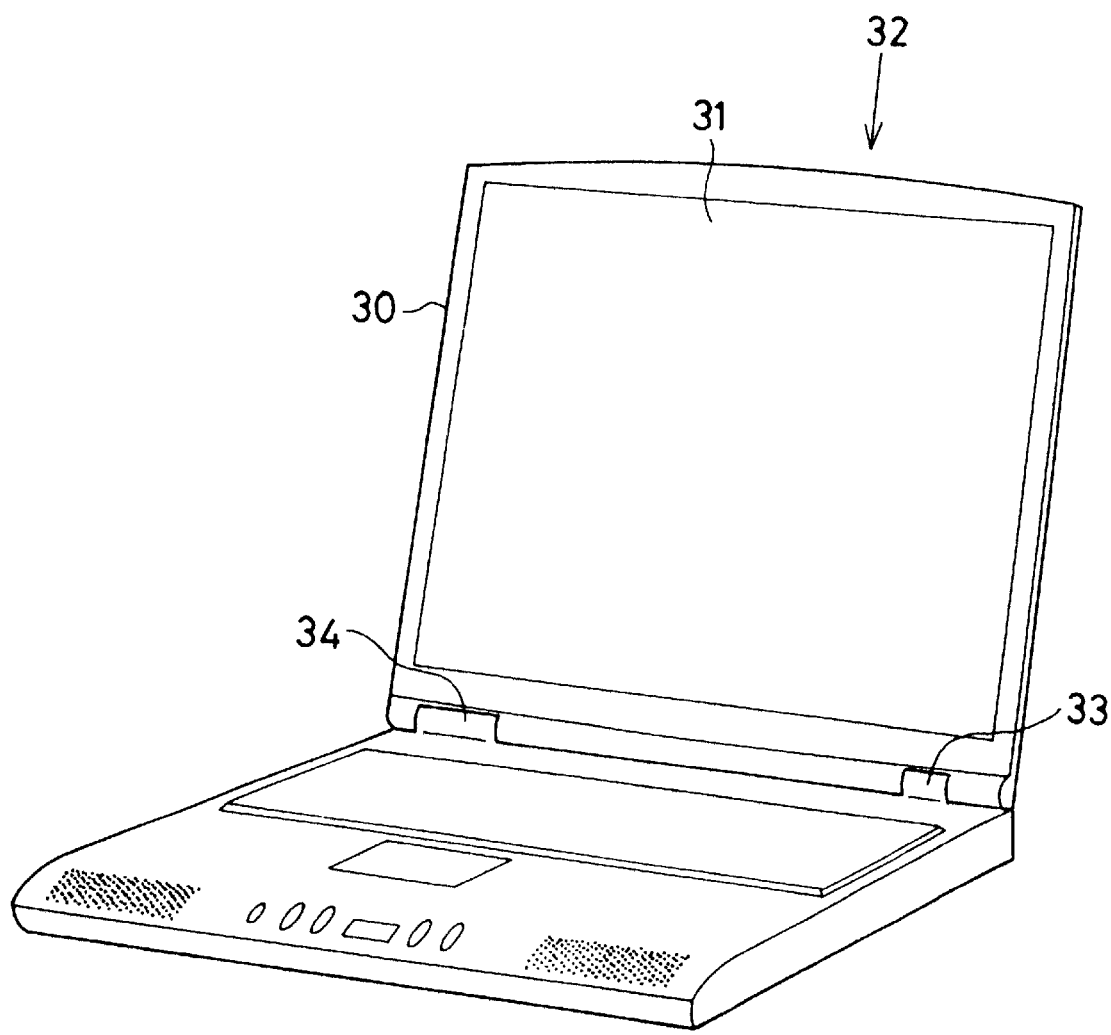
FIG. 1 is a perspective view of a laptop note type personal computer into which a frictional hinge device is incorporated according to a first embodiment of the invention.

Referring to FIGS. 1 through 12 which depict about a frictional hinge device 1 according to a first embodiment of the invention. The frictional hinge device 1 is used at lower ends 33, 34 to pivotally move a lid plate 30 for a liquid crystal display 31 in a laptop note type personal computer 32 (portable business device) as shown in FIG. 1. The lid plate 30 is adjusted at its pivotal angle to secure a good position so as to visually recognize information in the liquid crystal display 31.

Figure 1A:
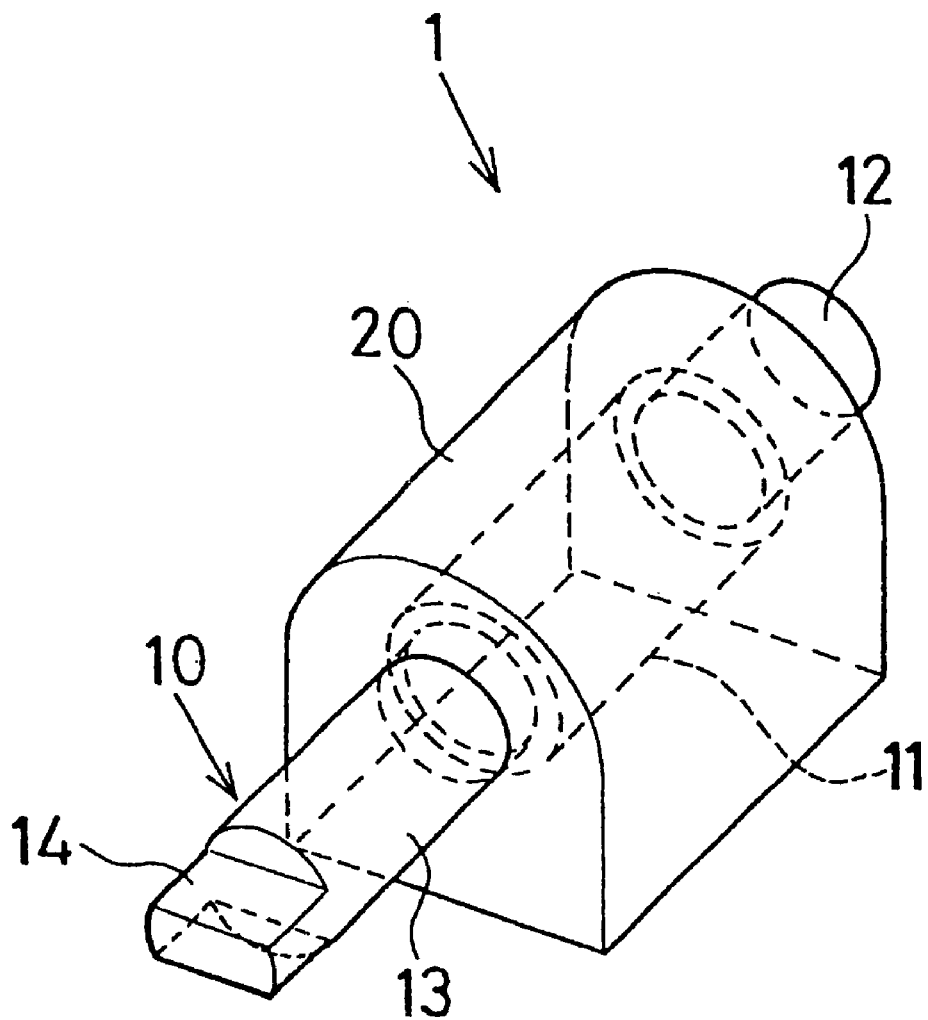
FIG. 1a is a perspective view of the frictional hinge device.

As shown in FIG. 1a, the frictional hinge device 1 has a metallic shaft 10 which serves as a rotational axis of a rotational center. The metallic shaft 10 is secured to the lid plate 30 of the personal computer 32 to pivotally move in unison with the lid plate 30. A support block 20 is provided to pivotably support the metallic shaft 10.

Figure 2:
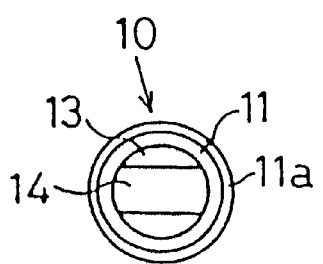
FIG. 2 is a plan view of a shaft member of the frictional hinge device.
Figure 3:
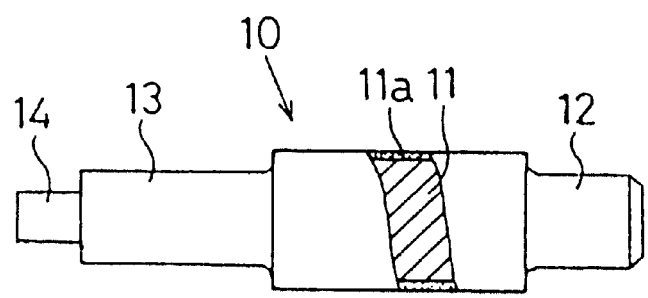
FIG. 3 is a side elevational view of the shaft member of the frictional hinge device.

As depicted in FIGS. 2, 3, the metallic shaft 10 is made of steel or stainless steel (SUS) to form a bar-shaped configuration. The metallic shaft 10 has a diameter-increased section 11 (e.g., 5 mm in diameter) in middle portion and diameter-reduced sections 12, 13 (e.g., 4 mm in diameter) in right and left end sides. The left ended diameter-reduced section 13 has a dowel 14 to connectedly interfit into the lid plate 30.

Please amend the paragraph beginning on page 6, line 19, as follows: As shown in FIGS. 4, 5, the support block 20 is formed by a synthetic resin which tightly engages with an outer surface of the diameter-increased section 11 of the metallic shaft 10.In this instance, the synthetic resin powder is injected into a die mold (heated to about 140 ° C.) in which the metallic shaft 10 was beforehand placed. This leaves a residual stress, as a result of shrinkage during cooling, to act as a surface frictional resistance between the support block 20 and the metallic shaft 10.

The frictional hinge device 1 holds the lid plate 30 at any angle against a main body of the personal computer 32. For this reason, it is necessary to adjust a relative torque of the metallic shaft 10 against the support block 20 when the torque is less than a predetermined value. While it is necessary to provide a smooth pivotal movement with the metallic shaft 10 when the torque is greater than the predetermined value.

In more tangible terms, it is required for the metallic shaft 10 to ensure a stable torque of about 1 ~20 kgf·cm while it is necessary to secure about 50000 times of open and closure operation as an endurable time limit when an open and closure operation of the lid plate 30 is counted. When 50000 times of the open and closure operation is counted, it is requisite that a torque holding rate must be 80% or more of an initial torque which is exhibited at the first open and closure operation of the lid plate 30.

In this instance, the torque holding rate is expressed as follows:

Torque holding rate (%)=(torque deteriorated due to heat or endurable limit)×100/(initial torque)

Figure 6:
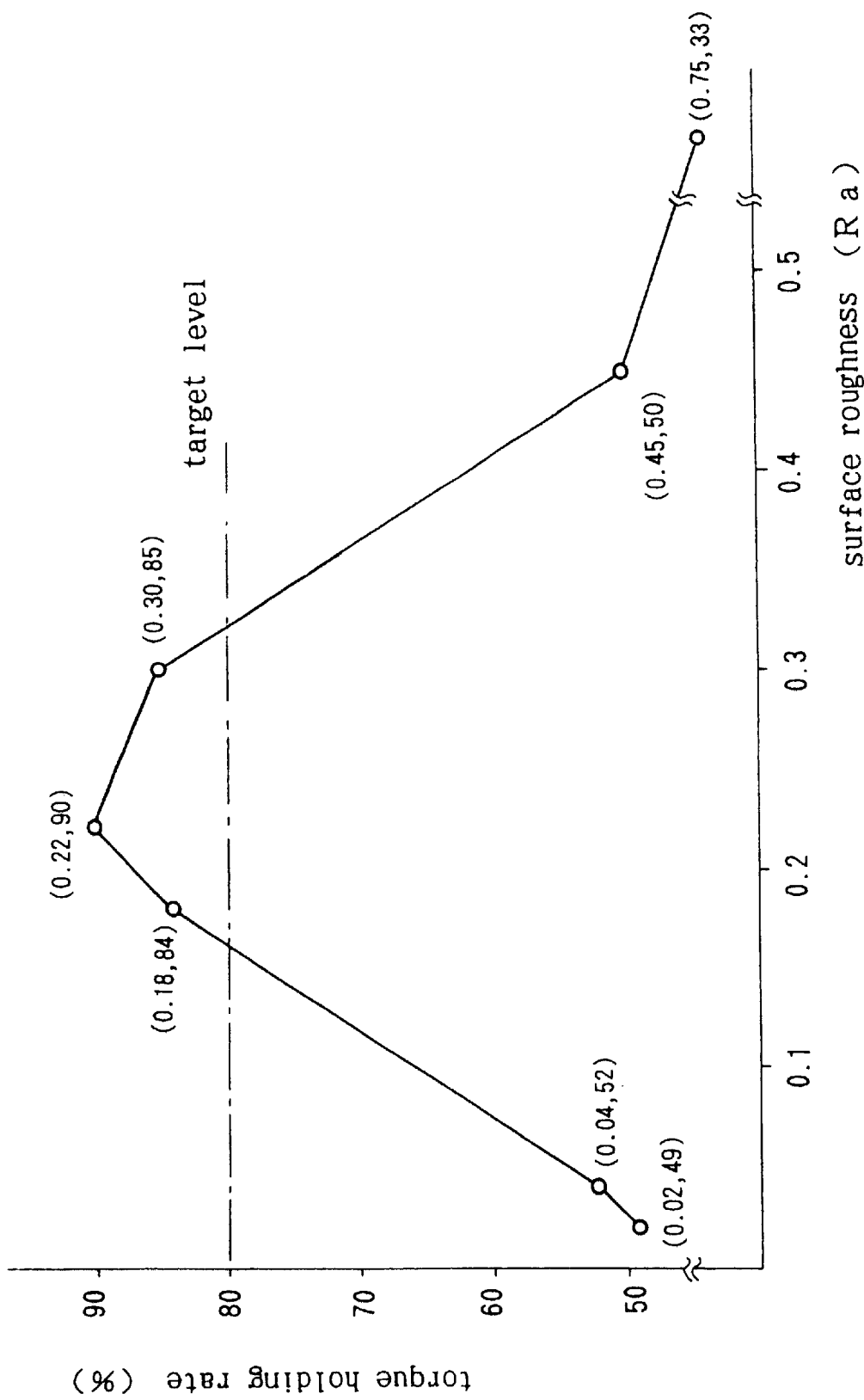
FIG. 6 is a characteristics showing a relationship between a surface roughness and a torque holding rate represented after operating the frictional hinge device by predetermined times in order to describe an efficiency.

In order to satisfy the above requirements, researches have been carried out to seek an optimum surface roughness (Ra) at the outer surface of the diameter-increased section 11 of the metallic shaft 10. As shown in FIG. 6, it is necessary to ensure the surface roughness (Ra) of not 0.02~0.08 μm but 0.15~0.35 μm in order to obtain the torque holding rate of 80% or more of the initial torque when any desired times of operation is counted. When the surface roughness (Ra) is minute, it was found that variations of the torque increases while inducing a creaking noise due to the stickslip during the open and closure operation.

When the surface roughness (Ra) exceeds 0.7 μm or more, the metallic shaft 10 thickly scratches against the support block 20 with the increased stickslip. This increases the wear of the support block 20 enough to lose the residual stress due to the shrinkage allowance when about 1000 times of the open and closure operation is counted. It was found that the torque holding rate remarkably reduces when the surface roughness (Ra) exceeds 0.2 μm.

With the above experimental test results in mind, the optimum surface roughness (Ra) is represented by 0.15~0.35 μm at the outer surface of the diameter-increased section 11 of the metallic shaft 10.

Upon making the metallic shaft 10 from a metallic bar blank, the metallic bar blank is processed so that its surface roughness is about 0.1 μm thicker than the required surface roughness. As shown at numeral 11a in FIGS. 2, 3, the metallic bar blank is provided with a Ni—P plating layer (5.0~15 μm in thickness) or hardened Cr plating layer (5.0~15 μm in thickness), and polished with a buff to provide an antirust measure and good durability. This treatment provides the surface roughness (Ra) of 0.15~0.35 μm with the outer surface of the diameter-increased section 11 of the metallic shaft 10.

Figure 7:
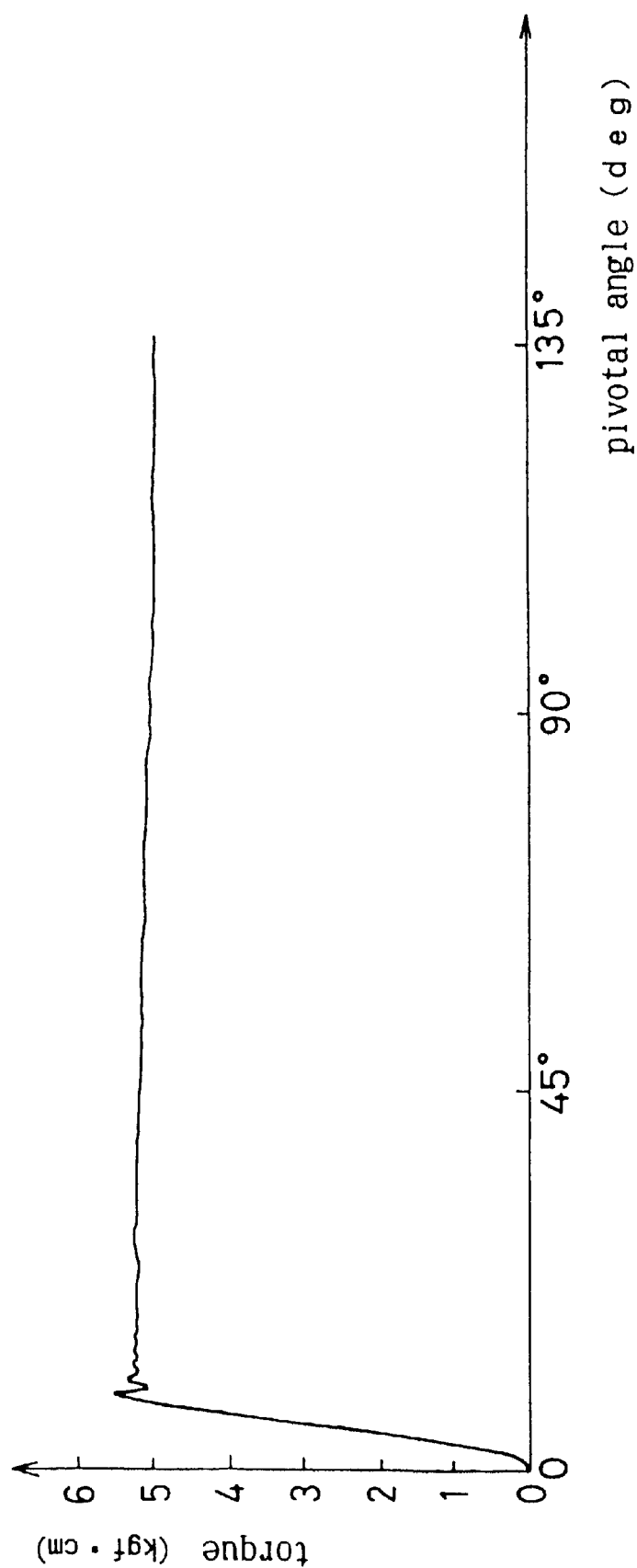
FIG. 7 is a characteristics showing a relationship between a pivotal angle and torque when providing an optimum surface roughness with the shaft member.
Figure 8:
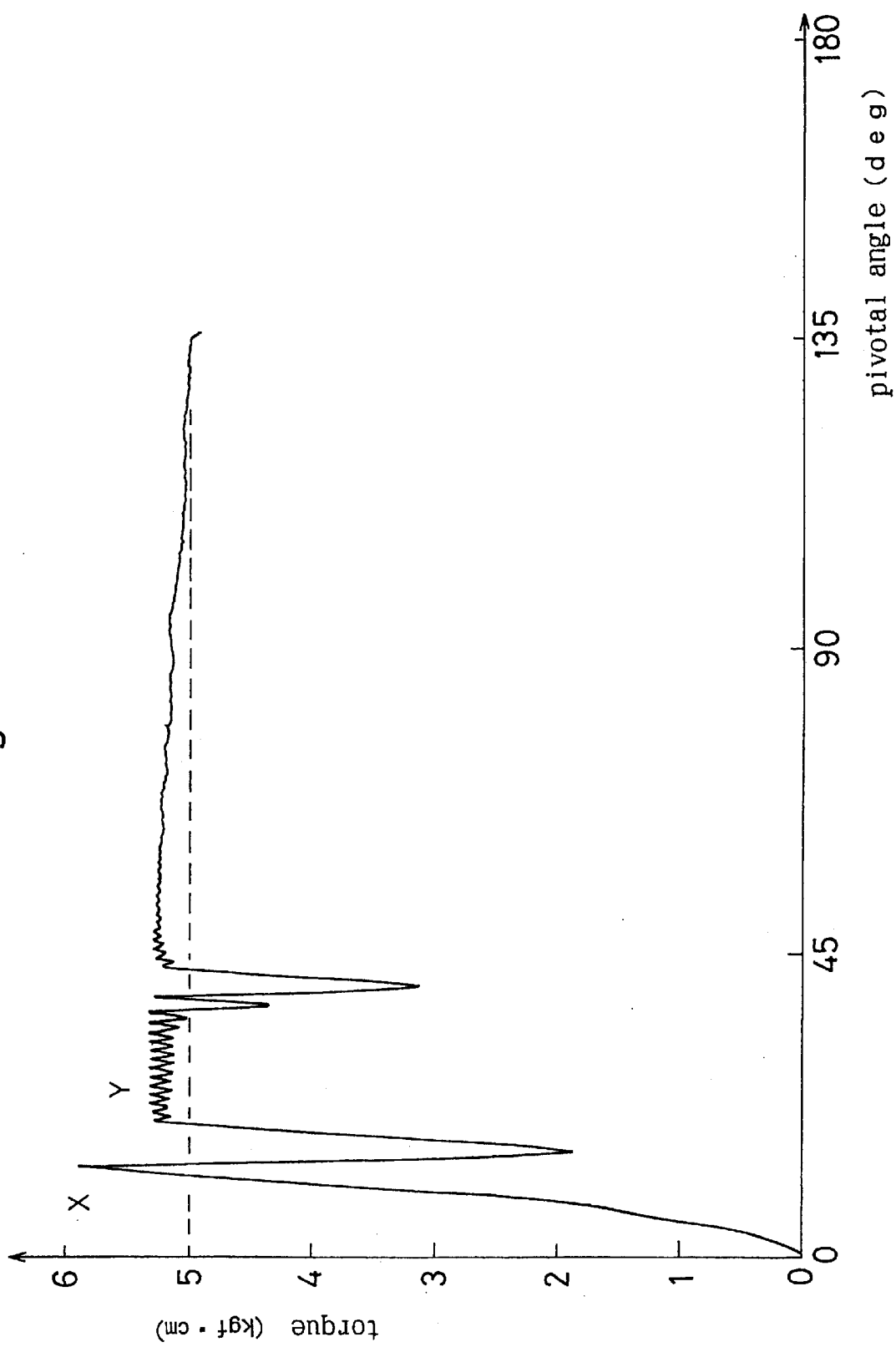
FIG. 8 is a characteristics showing a relationship between the pivotal angle and torque when providing a greater surface roughness with the shaft member.
Figure 9:
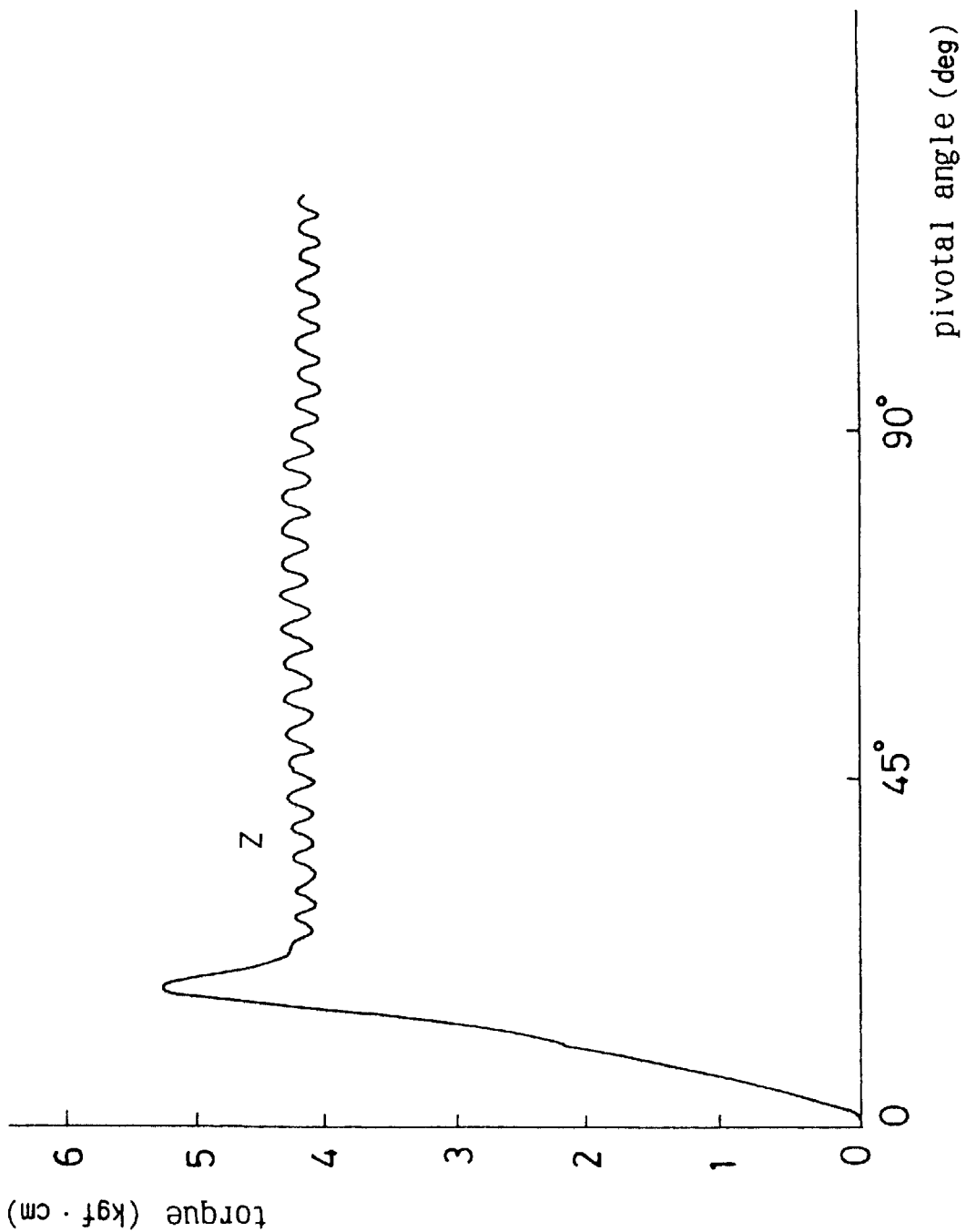
FIG. 9 is a characteristics showing a relationship between the pivotal angle and torque when providing a smaller surface roughness with the shaft member.

As a synthetic resin used to the support block 20, PAR (polyarylate) is selected herein. FIG. 7 shows a relationship between a pivotal angle and torque during the process in which the metallic shaft 10 pivotally moves to open and close the lid plate 30 with the surface roughness (Ra) at 0.18 μm. FIG. 8 shows a relationship between the pivotal angle and torque with the surface roughness (Ra) at 0.75 μm for the purpose of comparison. FIG. 9 shows a relationship between the pivotal angle and torque with the surface roughness (Ra) at 0.02 μm and 0.04 μm.

When the surface roughness (Ra) is 0.75 μm, the metallic shaft 10 thickly scratches against the support block 20 with a greater stickslip as denoted at X, Y in FIG. 8 when the metallic shaft 10 begins to pivotally move.

When the surface roughness (Ra) is 0.18 μm, it was found that the scratch and stickslip are inappreciably slight as shown in FIG. 7.

When the surface roughness (Ra) reduces to 0.02 μm, 0.04 μm, it was found that the stickslip increases as shown by Z in FIG. 9.

Table 1 lists up the pivotal torque, stickslip and scratch against variety of the surface roughnesses.

TABLE 1

| surface roughness (R a) | pivotal torque on average (kgf · cm) | stickslip (kgf · cm) | scratch (kgf · cm) |
|---|---|---|---|
| ① 0.75 μm | 4.9 | 0.2 | 3.0 |
|  | 5.2 | 0.2 | 4.0 |
| ② 0.18 μm | 4.9 | ≦0.1 | 0.4 |
|  | 5.1 |  | 1.4 |
| ③ 0.02 μm 0.04 μm | 4.8 | 0.2~0.3 | 1.0 |

Note:
The metallic shaft (4 mm in dia.) treated with Ni—P plating.
The support block made of PAR (polyarylate).
① represents a greater surface roughness.
② represents the present invention.
③ represents a smaller surface roughness.

In order to attain a stable frictional resistance with the metallic shaft 10, the synthetic resin used to the support block 20 has a smaller changing rate of a bending elasticity (GPa) under an operating temperature ranging from e.g., −20 to 80° C.

Figure 10:
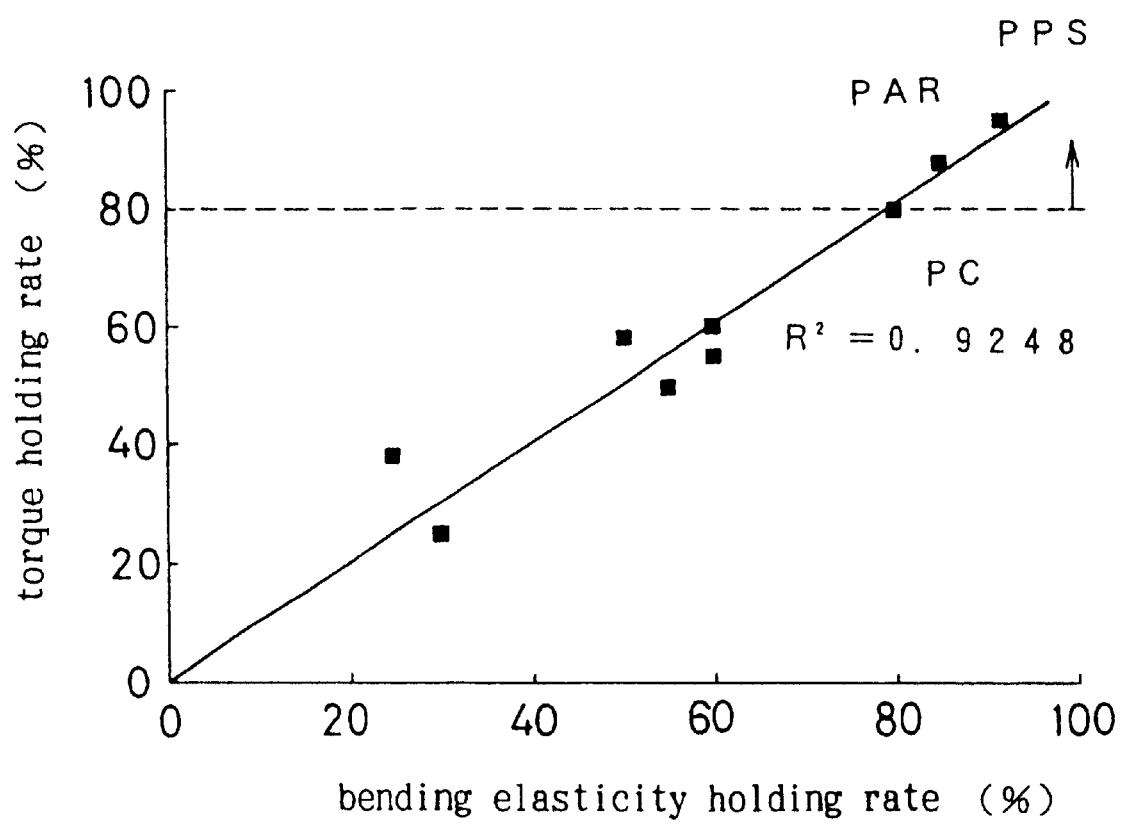
FIG. 10 is a characteristics showing a relationship between a bending elasticity holding rate and torque holding rate on a variety of synthetic resins.

This is based on a survey in FIG. 10 which represents a relationship between a torque holding rate and bending elasticity holding rate in which the torque holding rate of 80% or more corresponds to the bending elasticity holding rate of 80% or more. By using the synthetic resin having a higher bending elasticity holding rate (i.e., smaller changing rate of the bending elasticity under the predetermined operating temperature range), it is possible to achieve a higher torque holding rate.

Figure 11:
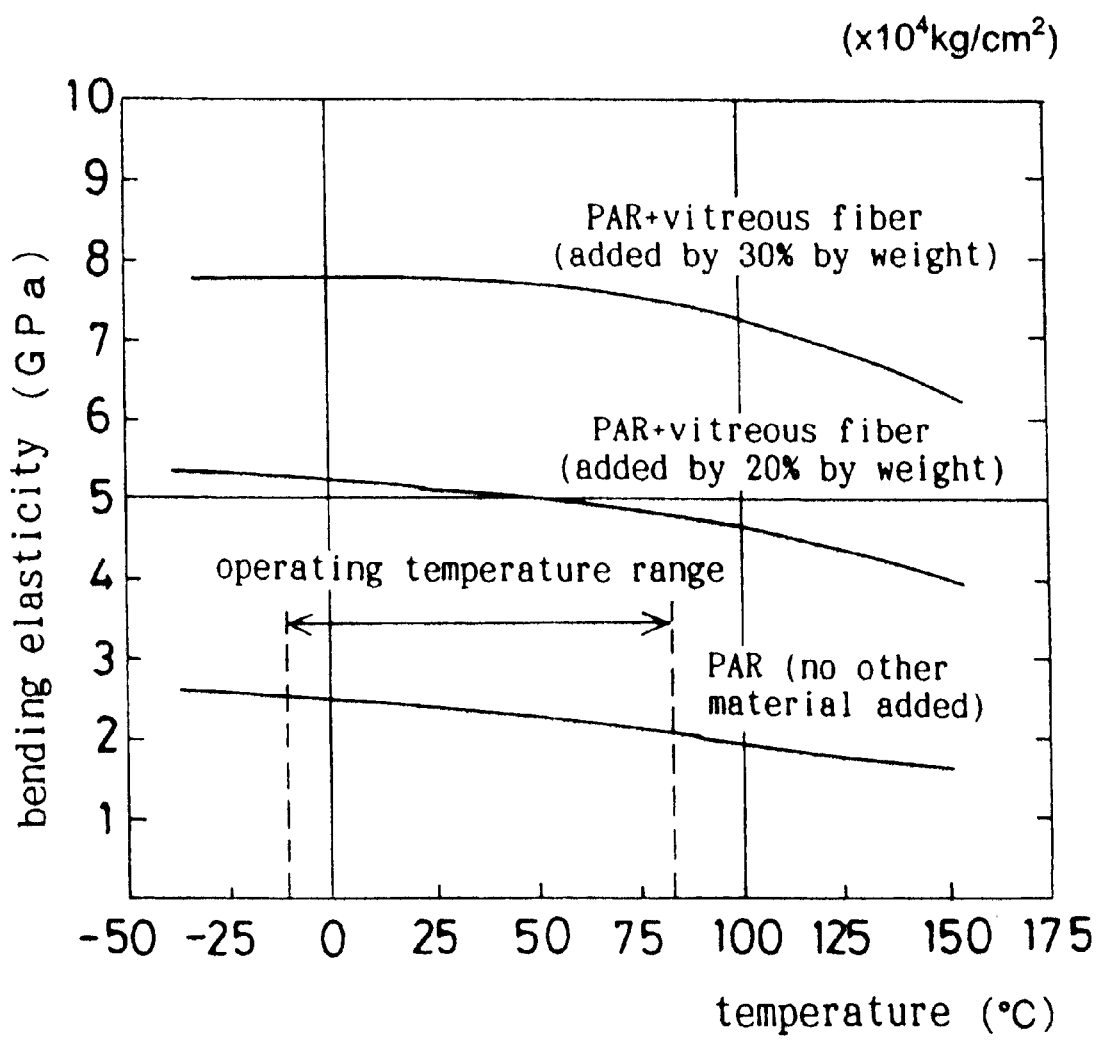
FIG. 11 is a characteristics showing a relationship between a bending elasticity and temperature on the synthetic resins in which a changing rate of the bending elasticity is relatively small.
Figure 12:
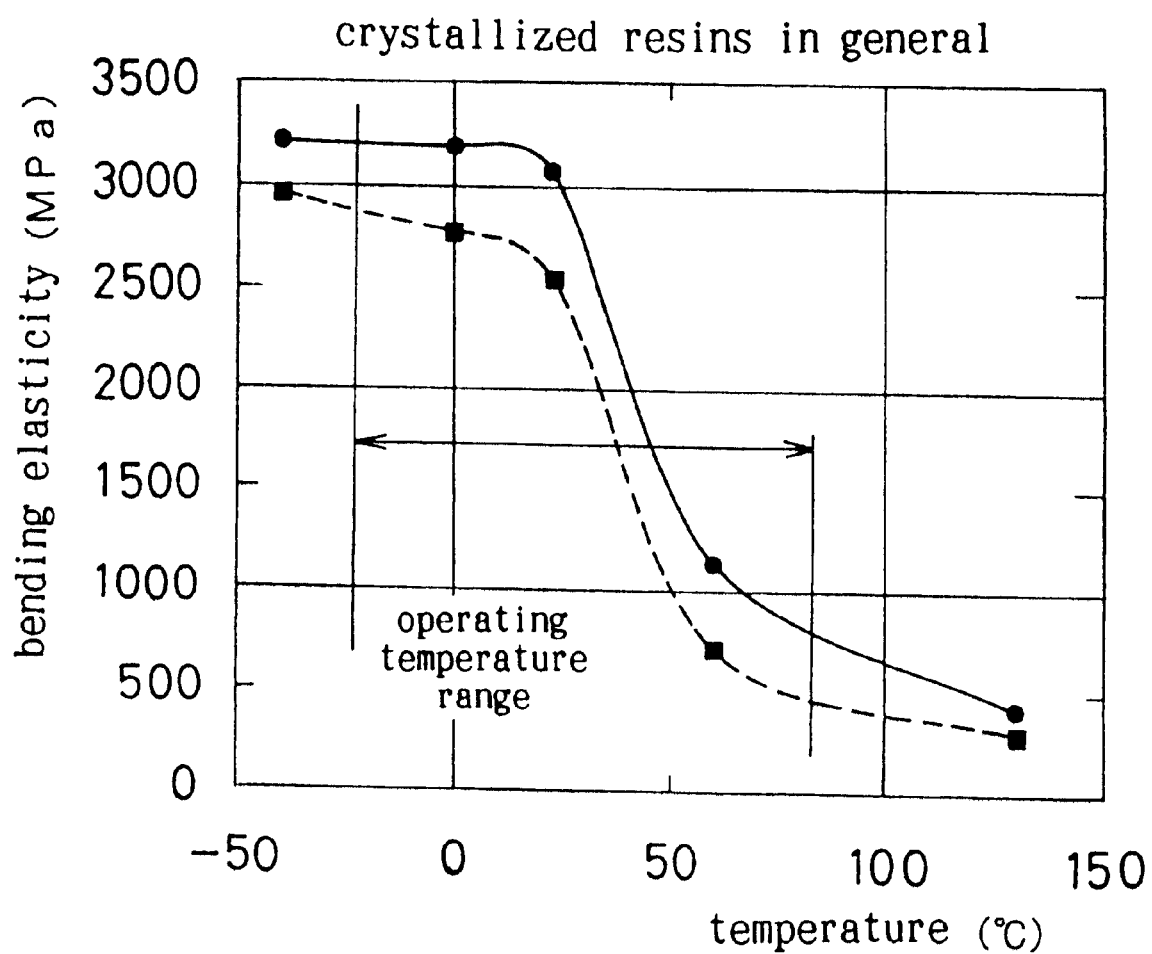
FIG. 12 is a characteristics showing a relationship between the bending elasticity and temperature on crystallized resins in general for the purpose of comparing with FIG. 11.

FIGS. 11, 12 show a relationship between the bending elasticity holding rate and the ambient temperature. As depicted in FIG. 11, PAR is suited to the synthetic resin for the support block 20 from the reason that the bending elasticity does not change significantly under the ambient temperature in which the personal computer 32 is placed. In the crystallized resins usually used in general, the bending elasticity changes greatly under the operating temperature as shown in FIG. 12. These crystallized resins are not suited for the support block 20 because they can not afford enough surface friction against the metallic shaft 10.

With this in mind, a suitable resin is selected as below which loses less physical properties when crystallized.

The resin represents PAR (polyarylate), PC (polycarbonate), PPS (polyphenylene sulphide), PES (polyether sulfone), PEEK (polyether ether ketone) and the like.

As a second embodiment of the invention, added to the above resin is an organic based antifriction medium (within 10% by weight) such as fluoro-based resin, olefine-based resin, carbon, carbon fiber or the like. Instead of the organic based antifriction medium, an inorganic based antifriction medium (within 10% by weight) can be selected from molybdate bisulfide, potassium titanate or the like.

Figure 13:
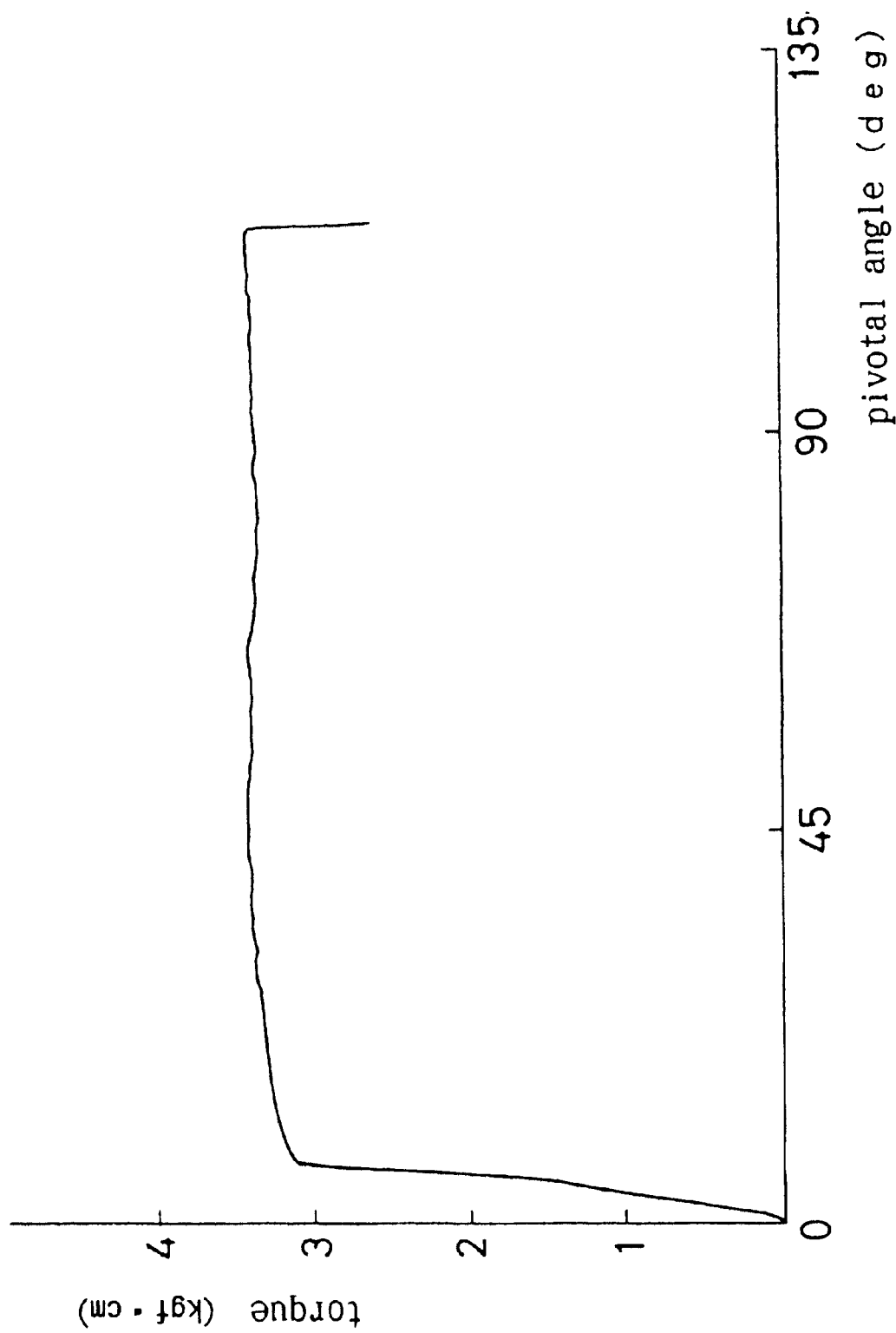
FIG. 13 is a characteristics showing a relationship between the pivotal angle and torque according to a second embodiment of the invention when an antifriction medium is added to the synthetic resin of a support member.
Figure 14:
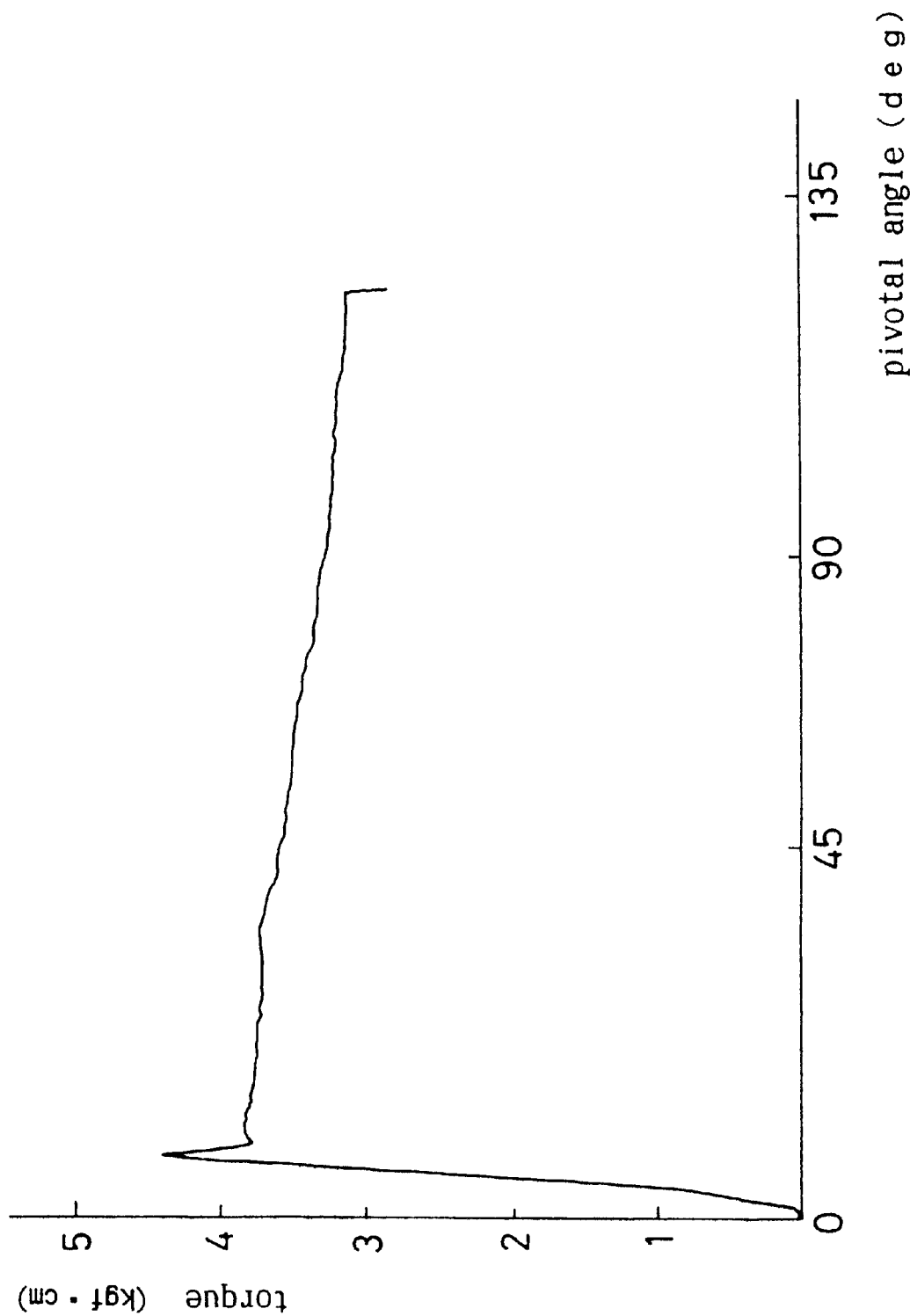
FIG. 14 is a characteristics showing a relationship between the pivotal angle and torque in parallel with FIG. 13 when an antifriction medium is not added to the synthetic resin of the support member.

By comparing FIG. 13 in which PTFE (polytetrafluoroethylene) is added by 3% by weight to the synthetic resin and FIG. 14 in which PTFE is not added, it was readily found that the metallic shaft 10 can pivotally move smoothly from the beginning when PTFE is added. This substantially reduces the wear dust due to the friction between the metallic shaft 10 and the support block 20.

Figure 15:
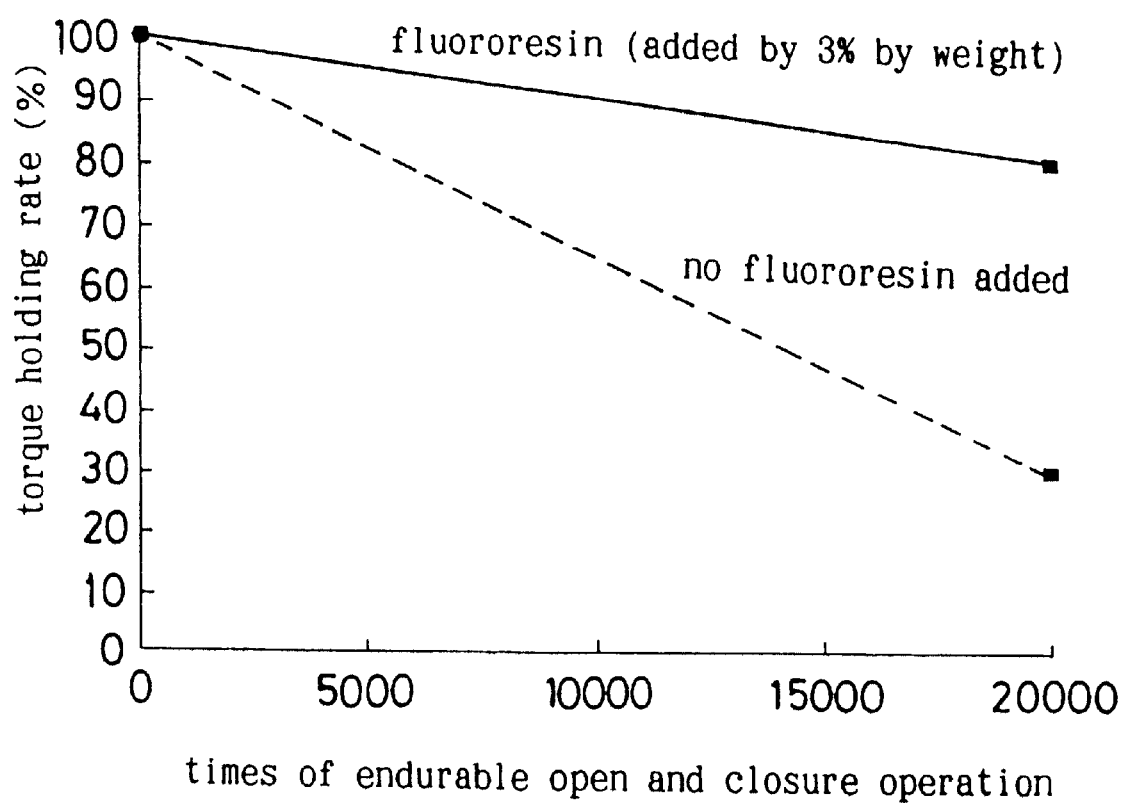
FIG. 15 is a characteristics showing a relationship between an endurance limit and a change of torque to compare when the antifriction medium is added and not added to the synthetic resin of the support member.

FIG. 15 compares the endurance in which the antifriction medium is added and the endurance in which the antifriction medium is not added. When the antifriction medium is added, reduction of the torque holding rate is almost inappreciable, thus leading to a long period of service life.

As a third embodiment of the invention, added to the synthetic resin is mineral, vitreous fiber, carbon fiber or the like at most by 40% by weight so as to impart a sufficient mechanical strength with the support block 20 when forming the support block 20 in integral with the metallic shaft 10.

As understood from the foregoing description, the metallic shaft 10 is treated so that the surface roughness (Ra) ranges from 0.15 to 0.35 µm, thus preventing the initial scratch and stickslip so as to maintain a stable friction between the metallic shaft 10 and the support block 20. This makes it possible to readily hold the lid plate 30 at the desired pivotal angle.

With the support block 20 and the metallic shaft 10 molded integrally, it is possible to reduce the manufacture cost.

With the use of the synthetic resin which has a smaller changing rate of the bending elasticity at the operating temperature, it is possible to maintain a stable surface frictional resistance between the metallic shaft 10 and the support block 20 for an extended period of time.

Upon opening and closing the lid plate, it is possible to frictionally hold the lid plate 30 at the desired pivotal angle with the stable friction under different circumstances. This makes various types of lid plates in the business devices more user-friendly.

It is to be noted that the surface treatment may be directly provided with the metallic shaft 10 by means of e.g., rolling procedure at a surface treatment step when determining the surface roughness (Ra) to be 0.15~0.35 µm.

It is to be observed that instead of the lid plate of the note type personal computer, the frictional hinge device may be applied to a lid plate of a copy machine, porcelain toilet, automobile hatch, hood or the like.

While there has been described what is at present thought to be preferred embodiments of the invention, it will be understood that modifications may be made therein and it is intended to cover in the appended claims all such modifications which fall within the scope of the invention.

what is claimed is:

1. A frictional hinge device comprising:
   a metallic shaft member having a rotational axis as a rotational center;
   a support member which rotationally supports said rotational axis of said metallic shaft member;
   said metallic shaft member being molded in a synthetic resin around said metallic shaft member integrally and being rotationally held at any angle by a surface frictional resistance caused between said support member and said metallic shaft member due to a shrinkage allowance of said support member when molding said synthetic resin around said metallic shaft member;
   an outer surface of said metallic shaft member being processed with a surface treatment to attain a surface roughness (Ra) ranging from 0.15 to 0.35 µm; and
   said surface treatment providing a Ni—P plating layer, and said Ni—P plating layer being polished with a buff so that a thickness of said Ni—P plating layer ranges from 5.0 to 15 µm.

2. A frictional hinge device comprising:
   a metallic shaft member having a rotational axis as a rotational center;
   a support member which rotationally supports said rotational axis of said metallic shaft member;
   said metallic shaft member being molded in a synthetic resin around said metallic shaft member integrally and being rotationally held at any angle by a surface frictional resistance caused between said support member and said metallic shaft member due to a shrinkage allowance of said support member when molding said synthetic resin around said metallic shaft member;
   an outer surface of said metallic shaft member being processed with a surface treatment to attain a surface roughness (Ra) ranging from 0.15 to 0.35 µm; and
   said surface treatment providing a hardened Cr plating layer, and said Cr plating layer being polished with a buff so that a thickness of said hardened Cr plating layer ranges from 5.0 to 15 µm.

\* \* \* \* \*